Figure 3:
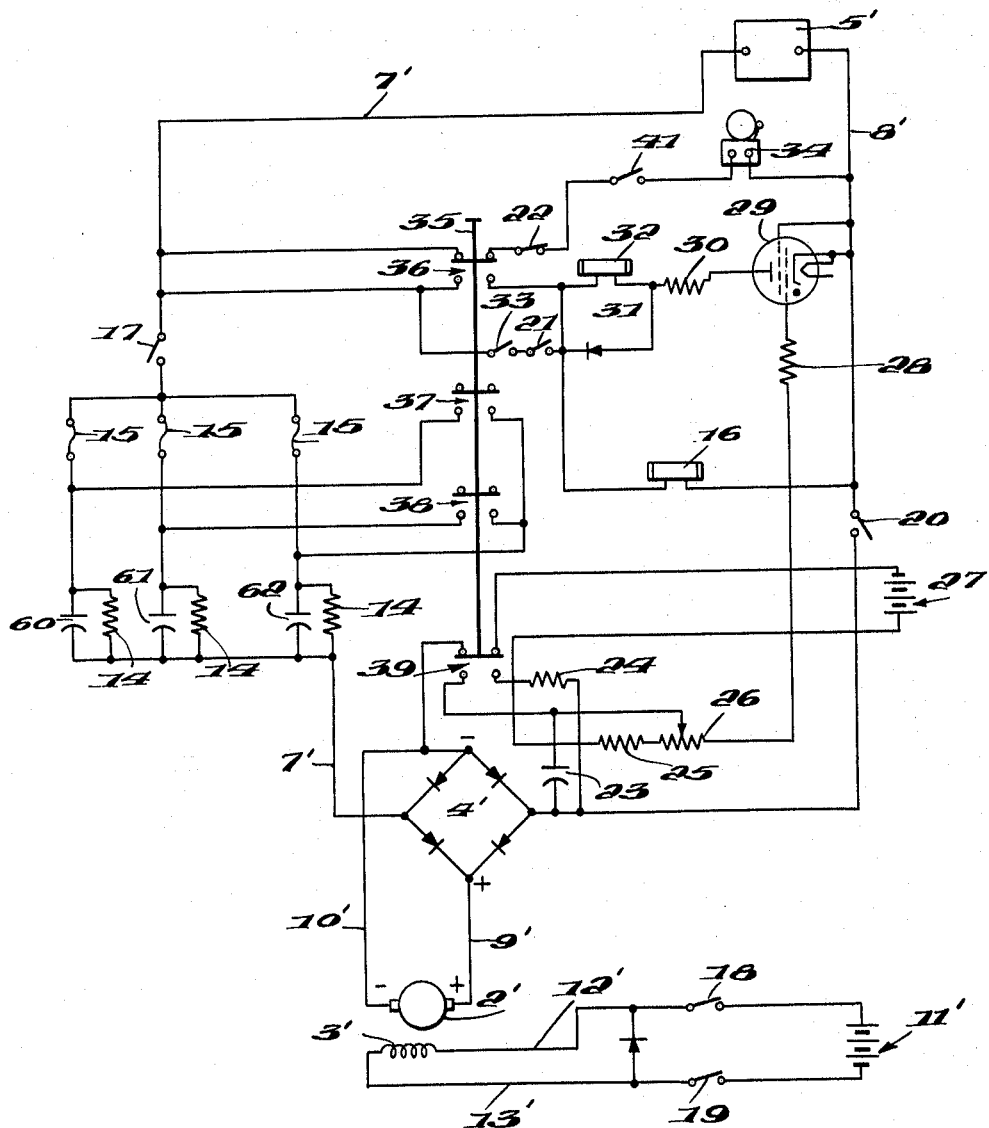

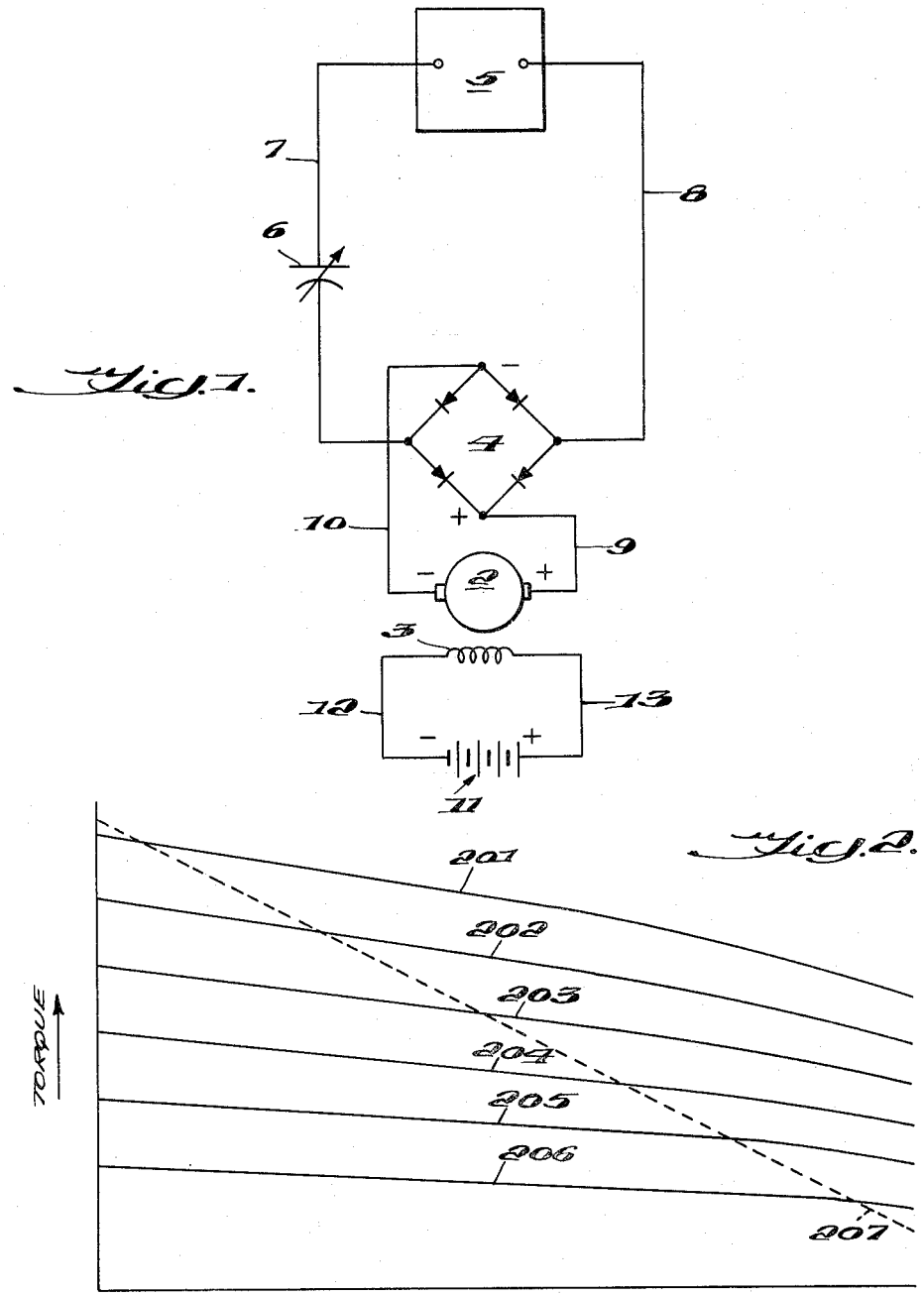

United States Patent Office 3,248,626
Patented Apr. 26, 1966

3,248,626
SERIES CAPACITOR IN SUPPLY FOR
D.C. MOTOR SYSTEM
James Philip Landis, Milwaukee, Wis., assignor to E. I. du Pont de Nemours and Company, Wilmington, Del., a corporation of Delaware
Filed Nov. 13, 1962, Ser. No. 237,396
1 Claim. (Cl. 318—347)

This invention relates to an electrical circuit for the control of rectifier fed D.C. motors. In particular, it relates to improved means for providing a "torque motor" drive, i.e., one with torque performance substantially independent of speed.

In the process of pumping highly viscous fluids, such as molten polymers, there are two extremes of operating conditions, namely, the extreme of excessive fluid viscosity and that of interrupted fluid supply. To insure a continuous pump drive under these extreme conditions, it is necessary that the motor control circuit have special characteristics. In the high load situation caused by excessive viscosity, the performance characteristics must be such that the motor will not over heat at near stall conditions. In the low load condition caused by an interrupted fluid supply, the characteristics must be such that the motor will not tend to over speed. Various "torque motor" drives are well known in the art. These include use of wound-rotor induction motors, eddy-current couplings and D.C. motors with added resistance in the armature circuit. Each of these known drives has shown disadvantages, to varying degrees, of high cost and/or high energy losses, particularly at low speeds approaching stall condition. Because of these disadvantages, the prior art drives have been found unsuitable for use in pumping viscous fluids.

It is an object of this invention to provide a reliable low-cost "torque motor" drive giving substantially constant torque over a wide range of speeds with reduced energy losses under heavy load conditions.

A further object is to provide a drive system having simply adjustable torque-speed characteristics.

It is a specific objective to provide for motor shut down and an alarm system when the motor reaches a speed above a predetermined over-speed condition and maintains this speed for a predetermined length of time.

A still further object is to provide a simple means for obtaining an indication of motor speed.

These objects are accomplished, according to the present invention, in a torque motor drive system which includes a D.C. motor having a rectified input to its armature, a fixed voltage field excitation input to the motor and a capacitive reactance in the A.C. line connection to the motor armature. Such a system has been improved by providing switch means in the A.C. line connection, relay means coupled with the switch means for holding the latter closed when the system is operating normally and a voltage responsive trigger means coupled to the rectified input. The trigger means includes a disabling component in circuit with the relay means whereby to de-energize the latter and open the switch means when an overspeed condition exists.

Other objectives will be apparent from the following specification wherein reference is made to the accompanying drawings, in which:

FIGURE 1 is a diagrammatic representation of a simplified "torque-motor" control system embodying the basic feature of this invention;

FIG. 2 shows various torque-speed characteristics for a D.C. motor when controlled by the circuitry of this invention and comparative characteristics for a D.C. motor not provided with the capacitor shown in FIG. 1; and FIG. 3 is a diagrammatic representation of a "torque motor" drive system including additional control features necessary to provide easily adjustable torque-speed characteristics and to provide for over-speed protection and indication.

The motor drive system of FIG. 1 consists of a D.C. motor having an armature 2 and a field winding 3. The field winding is separately excited by means of a conventional D.C. source shown at 11 as a battery, through conductors 12, 13. The armature windings receive electrical energy, through conductors 9, 10, from a rectifier 4 fed from a conventional A.C. line connection 5 through leads 7 and 8. In lead 7 there is provided a variable capacitor 6.

A series of torque-speed characteristic curves for a D.C. motor supplied by the drive system of this invention has been shown in FIG. 2. The illustrated curves 201–206 vary as a result of changes in value of the capacitance placed in the rectifier feed line. The broken line 207 is characteristic of the performance of an ordinary D.C. shunt motor with added resistance in the armature circuit. To provide a meaningful comparison, the shunt motor design is such that it has substantially the same no load maximum speed as the systems corresponding to curves 201–206, such a speed limitation being a requisite in gear pump drive systems.

The system components shown in FIG. 1 or their equivalents have been included in the system of FIG. 3 along with the other control features. Where applicable, the latter have been shown in the pre-start position. As illustrated, the system of FIG. 3 includes a D.C. motor having armature and field windings, the latter being excited from a separate source. As in FIG. 1, a bridge rectifier 4' is fed from an A.C. line connection 5' and furnishes D.C. to the motor armature. In lead 7' is provided a capacitor arrangement including three capacitors 60, 61, 62, each in series with a fuse block or switch 15 comprising, e.g., suitable slugs inserted between clips. In parallel with each of the capacitors is provided a discharge resistor 14 which functions to prevent a charge from being stored on any of the capacitors after shut down of the motor. The circuit is further provided with a relay including a coil 16 and associated relay switches 17–22, all of which are open before startup except for switch 22. A second relay includes a coil 32 and an open relay switch 33 in series with open switch 21 and a blocking rectifier 31. Provided also is a starting shaft 35 provided with a push button and opposed sets of terminals 36–39.

An over-speed detection and time-delay circuit includes a D.C. reference source 27 coupled with a thyratron trigger tube 29 through time-delay control resistors 25, 26 and a grid resistor 28. Tube 29 has a plate resistor 30 connected to rectifier 31 and open switches 21, 33. The sliding contact of resistor 26 is coupled to rectifier 4' through a capacitor 23 provided with a discharge resistor 24.

Finally, an alarm circuit is provided which includes an alarm 34 and a manual disconnect switch 41 in series with the closed switch 22 of relay coil 16.

In an essentially no-load operating condition, the D.C. motor shown in FIG. 1 draws very little D.C. current from bridge 4 and very little A.C. current is drawn from the line. Consequently, the voltage drop across capacitor 6 is negligible and essentially full A.C. line voltage is applied to the rectifier bridge 4. Accordingly, its D.C. voltage output is maximum and the motor runs at maximum speed. With increased torque demands, the D.C. motor is loaded and tends to slow down; additional D.C. armature current is drawn with the result that the A.C. current demand of the bridge rectifier increases. The resulting increased voltage drop across the capacitor 6 reduces the A.C. voltage applied to the bridge, and, hence, the D.C. voltage output of the bridge. The net result of the foregoing is a limitation on the D.C. current which can be drawn by the motor. By varying capacitor 6, the torque level at which the D.C. current will be limited can be adjusted. Thus, provision of capacitor 6 facilitates torque-speed control without the need for added resistance in the armature circuit and, therefore, with reduced energy losses under load conditions. FIG. 2 illustrates a family of torque-speed curves obtainable with stepwise changes in the value of capacitor 6 or with different combinations of the capacitors 60, 61, 62 shown in FIG. 3.

In each instance represented by the curves 201–206 in FIG. 2, provision of capacitive reactance in one A.C. connection to a rectification stage has imparted a substantially constant torque speed characteristic to the motor. When plotted with speed as the ordinate rather than the abscissa, each curve has a substantial negative slope.

Referring to FIG. 3, it will be obvious that operation of the basic circuit is the same as that described for FIG. 1. As noted above, three capacitors 60, 61, 62 are used. These normally have three different capacitance values. By use of the fuse blocks 15, it is possible to insert any combination of the capacitors into the rectifier circuit and thereby obtain the different torque-speed characteristics shown in FIG. 2. By selection of capacitors of different values, other families of curves can be obtained. Furthermore, more than three capacitors may be used to give a larger variety of characteristic curves. The resistor 14 in parallel with each of capacitors 60, 61, 62 serves primarily as a discharge resistor, i.e., to prevent a charge from being stored in any of the capacitors after shut down of the motor. Because the value of these resistors is high, no appreciable effect on performance of the D.C. motor results from their insertion in the circuit.

Upon first starting the machine, the push button on starting shaft 35 is depressed to close the lower sets of contacts 36, 37, 38, 39. Contacts 36 in their lower position energize relay coils 16, 32, thereby closing switches 21, 33, closing the field and armature supply circuits at switches 17, 18, 19, 20 and opening the alarm circuit at switch 22. At the same time, contacts 37, 38 place the three capacitors 60, 61, 62 in parallel giving minimum impedance and maximum available starting torque to the D.C. motor. Simultaneously, contacts 39 connect bleeder resistor 24 across the time-delay capacitor 23 to de-energize and, therefore, prepare it for subsequent operation in the time-delay circuit.

The time-delay circuit is provided to avoid frequent shut downs of the system due to momentary surges in speed. In operation, this time-delay circuit prevents voltage changes across the measured arm of bridge 4' from being instantaneously manifested as changes in the signal to the grid of the thyratron 29. This is evident since the voltage which is balanced against the D.C. reference voltage 27 is not that of one arm of the bridge directly, but is essentially the voltage appearing across the capacitor 23. Changes in voltages across the arm of the bridge do not instantaneously manifest themselves as changes in the voltage across capacitor 23 since resistors 25, 26 limit the current flow into or out of capacitor 23. The higher resistance 26 is made, the more slowly will the voltage across the capacitor follow the voltage across the arm of the bridge. Should the motor speed rise beyond the preset maximum after the starting shaft has been released and the motor has been in operation for a period under normal conditions, the voltage across the upper right-hand arm of the bridge will exceed the reference voltage. In accordance with the previous discussion, this will, after a time delay, result in de-energization of the thyratron tube 29 and, therefore, of relay coil 32. Upon de-energization of relay 32, associated switch 33 opens, thereby de-energizing relay coil 16 and the entire system. Switch 33 is referred to elsewhere as a disabling component in circuit with relay 16.

Since armature voltage is a very good indication of speed where motor field excitation is constant, operation of the over-speed detection circuit is apparent. As shown in FIG. 3, this system is connected to the upper right arm of rectifier 4' through capacitor 23, sees one half the voltage applied to armature 2' and compares the latter voltage with a preselected reference voltage from source 27. When the voltage across armature 2' becomes greater than twice the reference voltage, a signal is imposed through resistor 28 on the thyratron control grid. In this way, tube 29 is de-energized which, in turn, de-energizes relay coil 32 and opens switch 33. This de-energizes relay coil 16 and disconnects the field and armature power supplied by opening switches 17–20. Simultaneously, switch 22 is closed, thus furnishing energy to the alarm circuit 34 through switch 41 which was closed manually after startup of the motor.

In other constant torque D.C. motor systems, it has been customary to employ added resistance in series with the armature in order to control the armature current under load. In these cases, it has sometimes been necessary to provide a field weakening feature. Elimination of this latter feature is accomplished by the circuitry of this invention, thus providing a major advantage in allowing more effective utilization of motor capacity by maintaining full field strength at all times. Furthermore, energy losses are minimized by elimination of unnecessary resistance in the armature winding circuit.

It is apparent that changes and modifications of the illustrated system may be accomplished without departing from the spirit of the present invention which is accordingly intended to be limited only by the scope of the appended claim.

Having thus described the invention, what is claimed as new and desired to be secured by Letters Patent is:

A torque motor drive system including a D.C. motor having a rectified input to its armature, a fixed voltage field excitation input to said motor and a capacitive reactance in the A.C. line connection to said armature, the improvement of which comprises provision of switch means in said line connection; relay means coupled with said switch means for holding the latter closed when the system is in operation; and a voltage responsive trigger means coupled to said rectified input, said trigger means including a disabling component in the circuit of said relay means whereby to de-energize said relay means and open said switch means when an overspeed condition exists.

References Cited by the Examiner
UNITED STATES PATENTS 3,001,120   9/1961   Bereskin _____ 321—24 X

OTHER REFERENCES

Publication: Kalenian, A., Torque-Motor Drive, in Product Engineering 32 (41), pages 105–107, Nov. 13, 1961.

ORIS L. RADER, *Primary Examiner.*